US011222553B2

(12) United States Patent
Krimsky

(10) Patent No.: US 11,222,553 B2
(45) Date of Patent: Jan. 11, 2022

(54) ENHANCED APPROACHES TO TRAINING FOR BRONCHOSCOPY AND THORACIC PROCEDURES

(71) Applicant: COVIDIEN LP, Mansfield, MA (US)

(72) Inventor: William S. Krimsky, Forest Hill, MD (US)

(73) Assignee: COVIDIEN LP, Mansfield, MA (US)

( * ) Notice: Subject to any disclaimer, the term of this patent is extended or adjusted under 35 U.S.C. 154(b) by 303 days.

(21) Appl. No.: 15/700,268

(22) Filed: Sep. 11, 2017

(65) Prior Publication Data
US 2018/0090030 A1 Mar. 29, 2018

Related U.S. Application Data

(60) Provisional application No. 62/400,194, filed on Sep. 27, 2016.

(51) Int. Cl.
*G09B 23/28* (2006.01)
*G09B 23/30* (2006.01)

(52) U.S. Cl.
CPC ......... *G09B 23/285* (2013.01); *G09B 23/303* (2013.01)

(58) Field of Classification Search
CPC ........ G09B 23/30; G09B 23/28; G09B 23/34; G09B 23/288; G09B 23/32; G09B 23/303; G09B 23/286
USPC .................................................. 434/267, 262
See application file for complete search history.

(56) References Cited

U.S. PATENT DOCUMENTS

| 3,209,469 | A | * | 10/1965 | James | G09B 23/288 434/265 |
| 5,584,701 | A | * | 12/1996 | Lampotang | A61B 5/1106 434/262 |
| 6,188,355 | B1 | | 2/2001 | Gilboa | |
| 9,247,992 | B2 | | 2/2016 | Ladtkow et al. | |
| 2004/0186517 | A1 | * | 9/2004 | Hill | A61N 1/056 607/2 |
| 2005/0214727 | A1 | * | 9/2005 | Stoianovici | G09B 23/28 434/262 |
| 2006/0121430 | A1 | * | 6/2006 | Winnike | G09B 23/30 434/267 |
| 2008/0227073 | A1 | * | 9/2008 | Bardsley | G09B 23/30 434/267 |

(Continued)

FOREIGN PATENT DOCUMENTS

WO 00/10456 A1 3/2000
WO 01/67035 A1 9/2001

*Primary Examiner* — James S. McClellan
(74) *Attorney, Agent, or Firm* — Carter, DeLuca & Farrell LLP

(57) ABSTRACT

Provided in accordance with the present disclosure are systems, devices, and methods useable in training for bronchoscopy and thoracic procedures. An exemplary system includes a housing unit configured to simulate the chest cavity of a patient, at least one simulated lung located within the housing unit, the at least one simulated lung including a plurality of airways, and an exterior of the at least one simulated lung being substantially sealed from the atmosphere by the housing unit, a respiratory controller configured to control inspiration and expiration of air into and out of the plurality of airways of the at least one simulated lung, and a fluid controller configured to control administration of fluids to the at least one simulated lung.

20 Claims, 6 Drawing Sheets

(56) References Cited

U.S. PATENT DOCUMENTS

| | | | | |
|---|---|---|---|---|
| 2010/0163023 A1* | 7/2010 | Singh | ............... | A61M 16/04 |
| | | | | 128/200.26 |
| 2011/0085720 A1 | 4/2011 | Averbuch | | |
| 2014/0220532 A1* | 8/2014 | Ghez | ............... | G09B 23/30 |
| | | | | 434/272 |
| 2014/0270441 A1 | 9/2014 | Baker | | |
| 2014/0281961 A1 | 9/2014 | Baker | | |
| 2014/0282216 A1 | 9/2014 | Baker | | |
| 2014/0315175 A1* | 10/2014 | Nguyen | ............... | G09B 23/32 |
| | | | | 434/272 |
| 2016/0000302 A1 | 1/2016 | Brown et al. | | |
| 2016/0000356 A1 | 1/2016 | Brown et al. | | |
| 2016/0302869 A1* | 10/2016 | Chopra | ............... | A61B 5/066 |
| 2016/0331343 A1* | 11/2016 | Hunter | ............... | A61B 8/445 |
| 2016/0379526 A1* | 12/2016 | Frembgen | ............... | G09B 23/285 |
| | | | | 434/272 |
| 2017/0265956 A1* | 9/2017 | Carlson | ............... | A61B 34/70 |

\* cited by examiner

ENHANCED APPROACHES TO TRAINING FOR BRONCHOSCOPY AND THORACIC PROCEDURES

CROSS REFERENCE TO RELATED APPLICATION

The present application claims the benefit of and priority to U.S. Provisional Application Ser. No. 62/400,194, filed on Sep. 27, 2016 the entire contents of which are incorporated herein by reference.

TECHNICAL FIELD

The present disclosure relates to surgical systems, and more particularly, to systems and methods of training for bronchoscopy and thoracic procedure techniques.

BACKGROUND

Existing models and techniques for training inexperienced doctors and nurses in bronchoscopy either use a low fidelity model that allows for rudimentary registration and navigation or high fidelity simulators that create an artificial environment for its user. These approaches, however, significantly disadvantage its users by failing to provide an environment and user experience that resembles the environment that a practicing doctor or nurse may experience while performing a bronchoscopy.

Among the major disadvantages of the low fidelity model that allows for rudimentary registration and navigation is that it simply fails to simulate sufficient clinical challenges or situations that a user is likely to encounter when the user becomes a practicing doctor or nurse. On the other hand, the high fidelity simulators essentially immerse the user in a myriad of virtual settings and user experiences such that the users quickly realize that they are in a purely simulated environment. Furthermore, the tools provided by the high fidelity simulators fail to resemble or reflect the tools used by practicing doctors or nurses, especially in terms of the size, dimensions, and functionality.

It is well documented that human beings are able quickly realize when they are in an artificial and virtual environment. It is also well documented that when human beings realize they are in a purely simulated environment, they are more likely to discount the experience as simply a simulation exercise rather than a training tool that prepares and improves their techniques in the real world.

SUMMARY

Provided in accordance with an embodiment of the present disclosure is a system useable in training for bronchoscopy and thoracic procedures. In an aspect of the present disclosure, the system includes a housing unit configured to simulate the chest cavity of a patient, at least one simulated lung located within the housing unit, the at least one simulated lung including a plurality of airways, and an exterior of the at least one simulated lung being substantially sealed from the atmosphere by the housing unit, a respiratory controller configured to control inspiration and expiration of air into and out of the plurality of airways of the at least one simulated lung, and a fluid controller configured to control administration of fluids to the at least one simulated lung.

In another aspect of the present disclosure, the system further comprises a thoracic navigation system including a catheter guide assembly.

In yet another aspect of the present disclosure, the thoracic navigation system includes a bronchoscope.

In still another aspect of the present disclosure, the thoracic navigation system includes an electromagnetic navigation system.

In yet another aspect of the present disclosure, the system further includes at least one tool insertable into the at least one simulated lung, the tool including a sensor detectable by the thoracic navigation system.

In still another aspect of the present disclosure, the fluid controller is connected to at least one fluid source.

In a further aspect of the present disclosure, the fluid source is in fluid communication with a vascular network of the at least one simulated lung, and the fluid simulates blood.

In another aspect of the present disclosure, the fluid source is in fluid communication with one or more locations within the plurality of airways, and the fluid simulates mucus.

In yet another aspect of the present disclosure, the fluid controller is configured to inject fluid from the fluid source into the airways of the at least one simulated lung based on the location of a tool within the at least one simulated lung to simulate an airway hemorrhage or pneumothorax.

In a further aspect of the present disclosure, the location of the tool is determined by a thoracic navigation system.

In another aspect of the present disclosure, the respiratory controller is configured to control the inspiration and expiration of air into the at least one simulated lung to simulate coughing or other respiratory variations.

In yet another aspect of the present disclosure, the system further includes a vacuum source which is controlled by the respiratory controller and in fluid communication with the plurality of airways to simulate coughing or other respiratory variations by suctioning air out of the at least one simulated lung.

In still another aspect of the present disclosure, the system further includes an inflatable bladder within the housing unit, wherein rapid inflation of the bladder forces deflation of the at least one simulated lung to simulate coughing or a pneumothorax.

In yet another aspect of the present disclosure, the respiratory controller is configured to simulate tidal volume breathing of a patient.

In still another aspect of the present disclosure, the system further includes a display device, and a computing device in communication with the thoracic navigation system and the display device, the computing device being configured to cause the display device to present one or more user interface images representing the location of a tool within the at least one simulated lung in relation to one or more pre-procedure images.

In yet another aspect of the present disclosure, the system further includes a display device, and a computing device in communication with the thoracic navigation system and the display device, the computing device being configured to cause the display device to present one or more user interface images representing the location of a tool within the at least one simulated lung in relation to a 3D model of the at least one simulated lung.

In still another aspect of the present disclosure, the system further includes an intra-procedure imaging modality.

In a further aspect of the present disclosure, a display device, and a computing device in communication with the thoracic navigation system and the display, the computing device being configured to cause the display device to present one or more user interface images representing the location of a tool within the at least one simulated lung in relation to one or more intra-procedure images.

In yet a further aspect of the present disclosure, the intra-procedure images are presented in combination with the pre-procedure images.

In another aspect of the present disclosure, the system further includes a tool insertable from an exterior of the housing unit through a membrane in an interior of the housing unit and into the at least one simulated lung while maintaining appropriate partitions and pressure differentials within the housing unit.

BRIEF DESCRIPTION OF THE DRAWINGS

Various aspects and features of the present disclosure are described hereinbelow with references to the drawings, wherein.

DETAILED DESCRIPTION

Figure 1A:
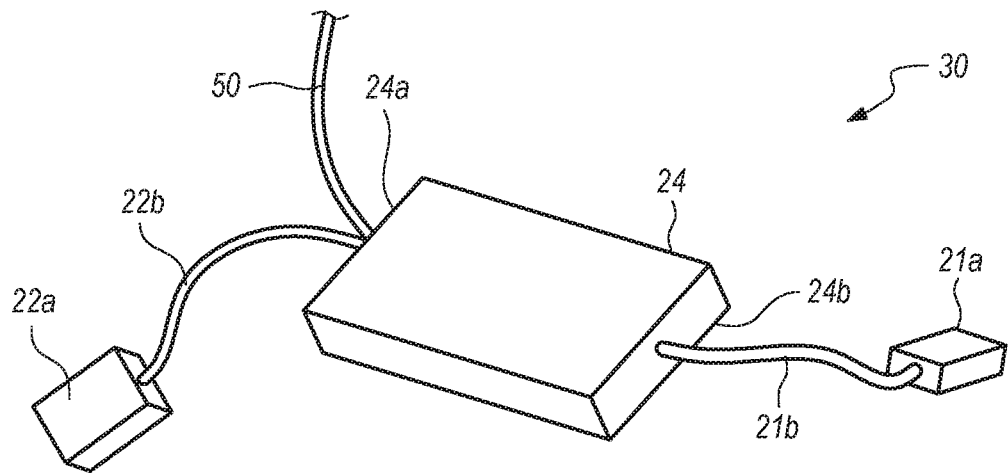
FIGS. 1A-1D illustrates an example arrangement of an integrated simulation system.

The present disclosure is directed to systems and methods for enhanced approaches to training for bronchoscopy, percutaneous, and other thoracic procedures. Embodiments of the present disclosure are now described in detail with reference to the drawings in which like reference numerals designate identical or corresponding elements in each of the several views. As used herein, the term "clinician" refers to a doctor, a nurse, support personnel or any other person that may use integrated training system described herein to train on bronchoscopy techniques. Throughout this description, the term "proximal" will refer to the portion of the device or component thereof that is closer to the clinician and the term "distal" will refer to the portion of the device or component thereof that is farther from the clinician. Additionally, in the drawings and in the description that follows, terms such as front, rear, upper, lower, top, bottom, and similar directional terms are used simply for convenience of description and are not intended to limit the disclosure. In the following description, well-known functions or constructions are not described in detail to avoid obscuring the present disclosure in unnecessary detail.

As described above, the existing methods and models for training clinicians with respect to navigational bronchoscopy and percutaneous procedures such as percutaneous biopsy, fiducial marker placement, etc., and/or pleura procedures (e.g., pneumothorax sealing) are typically either (1) low fidelity models that allow for performance of only rudimentary registration and navigation, or (2) high fidelity simulators that provide an artificial and virtual environment. Furthermore, as described above, the low fidelity models that allow for performance of only rudimentary registration and navigation fail to provide sufficient clinical challenges and settings that a practicing doctor or nurse may encounter in the real-world.

In high fidelity simulators, the users are provided with tools that often fail to resemble or simulate the tools that are used in practice, especially in terms of size, dimensions or functionality. Furthermore, the users insert any provided tool into a port of the simulator, which is a computing tower. Additionally, the entire procedure is performed virtually, where the user's interactions with the actual procedure is only through the display device displaying the simulated procedure being performed. In other words, the environment created by the high fidelity models reflects an environment that is closer to a video game and provides a user experience similar to a video game, as opposed to an environment and user experience that is closer to a real-world environment and real-world user experience. Thus, the high fidelity simulators create an environment which is artificial and virtual. Therefore, it is very easy for users to realize that they are in a virtual environment as oppose to a real-world Accordingly, the users begin to discount their experience thereby undermining the value of the simulator and of the training.

The present disclosure provides apparatus, systems and techniques that create a real-world environment and a real-world user experience for training clinicians in thoracic procedures such as bronchoscopy, percutaneous biopsy, etc. The integrated system described herein includes a housing unit. The housing unit may be opaque or clear, and may contain material, such as a membrane, that would allow for an instrument to pass through while maintaining the requisite partitions, pressure differentials, boundaries, etc. The housing unit may be a box or in a form that resembles a human body. The housing unit may be configured and dimensioned to house a set of lungs, such as animal lungs and/or simulated lungs. The set of animal lungs may be any set of lungs that are anatomically similar to the human lungs. In some embodiments, the set of animal lungs may be ovine lungs.

The housing unit may be coupled or connected to a respiratory device using a tube that connects to the set of lungs housed within the housing unit. The respiratory device may be configured to simulate respiratory activity within the set of lungs housed in the housing unit. The respiratory device may comprise an air pumping mechanism or unit and may be programmatically configured to control the amount of air that is pumped into the set of lungs. In some embodiments, the respiratory device may be configured to operate in a closed-loop system, thereby inspiring and expiring the same air repeatedly to simulate breathing. In further embodiments, the respiratory device may use one or more air tanks or other air storage devices as the source of the air used to simulate respiratory activity. In other embodiments, the respiratory device may be configured to operate in an open system, wherein air from outside the system is used to inflate the lungs and the air is expelled from the system upon deflation of the lungs. The respiratory device may also be configured to control the frequency at which air is pumped into the lungs within the housing unit. Thus, a simulation of a pneumothorax can be created and a clinician may be trained to either percutaneously or bronchoscopically treat such a condition, as well as identify the signs that might signal the onset of a pneumothorax. Additionally, a fluid filled space can also be created and/or simulated and a clinician may be trained to treat and/or identify such a condition.

A bronchoscope may be inserted into the housing unit and further into the set of lungs within the housing unit. Thus, a clinician may also train in inserting a bronchoscope into a set of lungs using the system described herein. An extended working channel may be inserted into the bronchoscope and various navigational and surgical tools may be inserted into the extended working channel. The housing unit may be coupled or connected to one or more controllers that control various fluid sources. The controllers may be connected to one or more medical grade tubes such as catheters. The catheters may also be connected to one or more fluid sources. The catheters may be inserted within the airways of the lungs within the housing unit. The fluid sources may comprise any type of fluid such as blood, mucus, etc. The system may be programmed to inject blood or mucus based upon a number of factors, including the type of procedure for which a clinician is training, the location of a navigation tool within the airways of the lungs, injuries to the lungs and/or airways, etc. In some embodiments, the injection of blood or mucus into the lungs may be programmed to occur randomly. Thus, a simulation of a significant airway hemorrhage can be created.

Additionally, one or more surgical tools may be inserted from the outside of the housing unit through the walls of the housing unit and further inserted into the lungs inside the housing unit, such as to train the clinician to perform a percutaneous procedure. The housing unit may be constructed and/or configured such that pressure differentials and/or partitions among various sections of the housing unit are maintained during insertion of tools from outside of the housing unit. In embodiments, a membrane may be included inside the housing unit and surrounding the lungs to maintain such pressure differentials and/or partitions. Further, obstructions, such as ribs, organs, blood vessels, and/or other structures that may obstruct passage of tools into the lungs, may be simulated to aid in training the clinician to account for such obstructions during percutaneous procedures.

The integrated system described herein may also include a threat analysis module. The threat analysis module may provide various alerts to the clinician to warn the clinician of the possibility of any damage to structures within the lungs which are not the subject of the procedures for which the clinician is training. The integrated system described herein may also include a predictive modeling module that predicts location of lesions within the lungs. A clinician may train on localization techniques in identifying and navigating to the actual area within the lungs where a lesion is predicted to appear. Training on such localization techniques are tremendously valuable since the prediction of lesions with such prediction models is rarely 100 percent accurate in identifying the precise and exact location or area within the anatomical structures of the lungs. Therefore, training on localization techniques may help improve the clinician's ability to calibrate her approach in identifying and navigating to the predicted lesion area similar to how a practitioner such as a doctor may have to perform in the real-world.

FIG. 1A depicts an exemplary arrangement of a housing unit that is part of the integrated system used in training clinicians for bronchoscopy. The specific number of components of system 30 depicted in FIG. 1A and the arrangement and configuration thereof are provided for illustrative purposes only, and should not be construed as limiting. For instance, various embodiments herein employ fewer or greater than all of the components shown in FIG. 1A. Additionally, the system 30 depicted in FIG. 1A is provided as an example context in which various example embodiments herein are applicable. However, the various example embodiments herein are also applicable in contexts other than integrated surgical systems, for example, in reviewing a video of a surgery for instructional purposes.

Figure 1B:
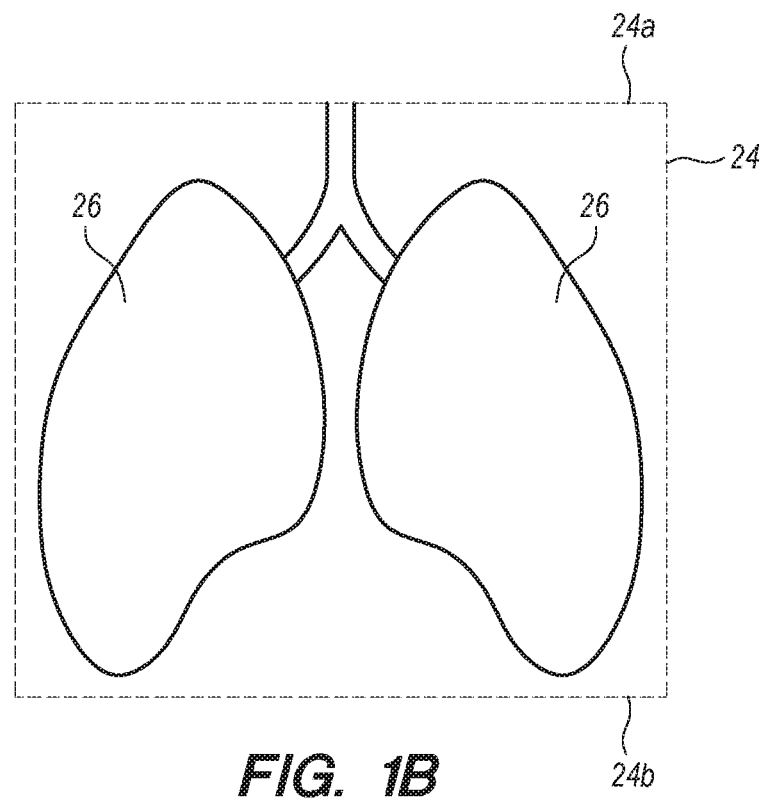

Housing unit 24 houses a set of animal lungs. Housing unit 24 may simulate a chest cavity of a patient. In some embodiments, a single lung may be housed within housing unit 24. The set of animal lungs may be any type of lungs that are similar anatomically to human lungs, such as the lungs of ovine or sheep. FIG. 1B depicts a set of lungs 26 housed within housing unit 24. Lungs 26 comprise a plurality of airways. The plurality of airways of lungs 26 may be in fluid communication with the atmosphere while being housed within housing unit 24. The exterior of lungs 26 may be substantially sealed from the atmosphere by the housing unit 24 forming an analogous arrangement to human and animal lungs sealed within the chest cavity but internally open to the atmosphere. Housing unit 24 may have an opaque outer-surface or a clear outer-surface or an outer surface whose opacity can be changed to provide a clear option for when clinicians are first familiarizing themselves with the system, and an opaque option as familiarity is developed and a more life like setting with limited visibility of actions is desired. Housing unit 24 may be configured with several ports that allow housing unit 24 to connect to one or more devices of the integrated system described herein. Ports, including membranes, as described herein, is any opening on the surface of housing unit 24. As depicted in FIG. 1A, housing unit 24 comprises several ports on side 24a and side 24b. Housing unit 24 is coupled with respiratory controller 21a via tube 21b. Housing unit 24 is also coupled with fluid controller 22a via tube 22b. Bronchoscope 50 is inserted into housing unit 24 via one of the ports on side 24a. Additional details on bronchoscope 50 and other navigational tools (not shown in FIG. 1A) are described below in FIG. 2.

Figure 1C:
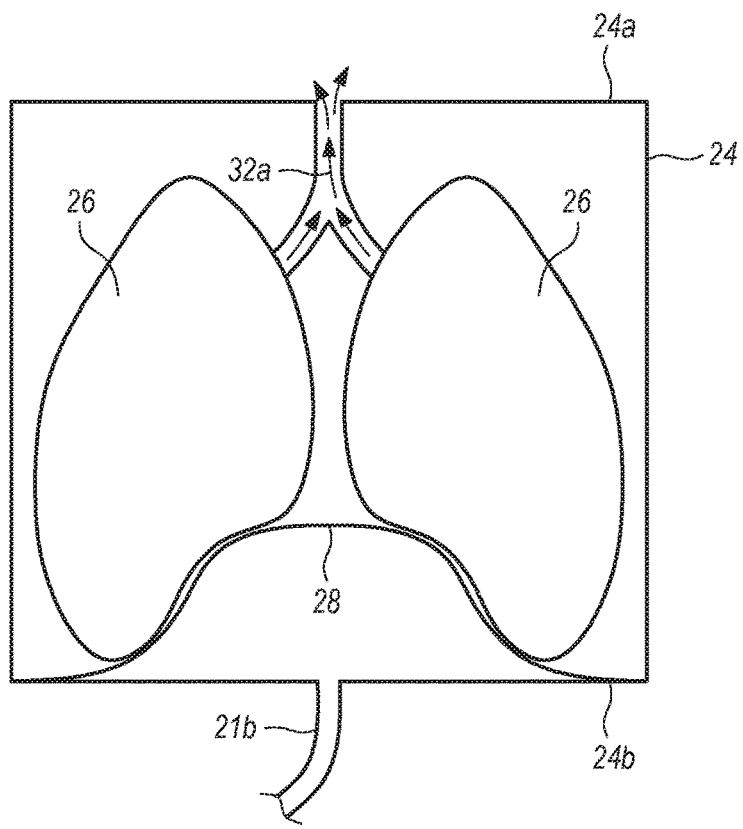
Figure 1D:
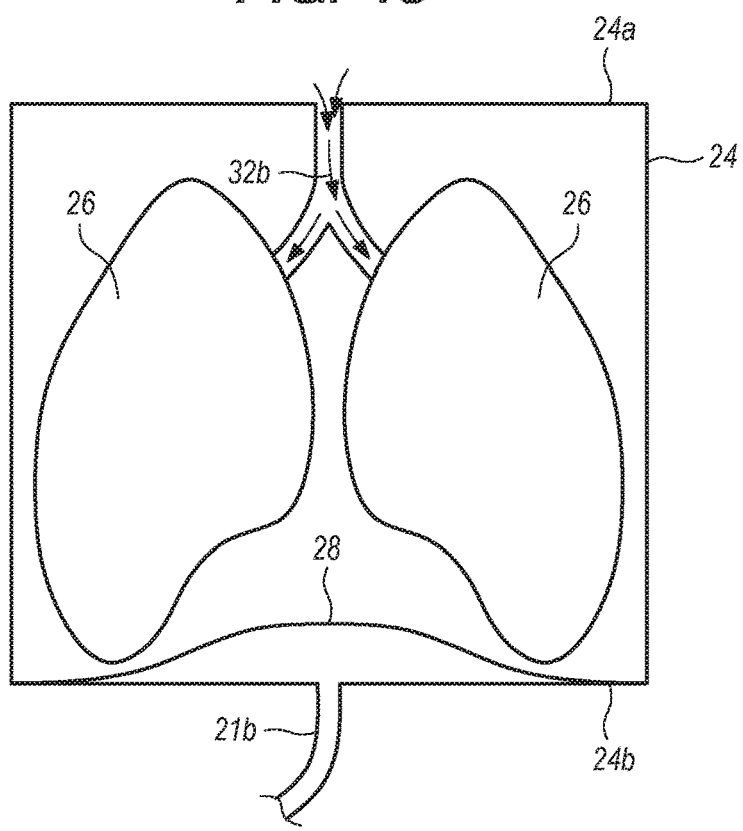

Respiratory controller 21a may be configured to control inspiration and expiration of air into and out of the plurality of airways of the lungs 26. Respiratory controller 21a may be connected to an air pump device, such as a ventilator (not shown). The amount of air output by the air pump device may be based on the respiratory controller 21a. Respiratory controller 21a may be connected to an inflatable bladder. FIG. 1C and FIG. 1D depict an exemplary arrangement of a respiratory controller connected to an inflatable bladder, inflatable bladder 28. In FIG. 1C and FIG. 1D, inflatable bladder 28 is housed within housing unit 24. Respiratory controller 21a may be configured to pump a certain volume of air into inflatable bladder 28 within the housing unit 24 via tube 21b. These volumes can be varied depending on the stage of the training. Respiratory controller 21a may also be configured to control the frequency at which the air pump device pumps air into inflatable bladder 28. In some embodiments, respiratory controller 21a may pump air into inflatable bladder 28 at a rate consistent with sedated patient's tidal breathing frequency, anywhere between 12 to 20 times per minute. If desired greater frequency and volume may be employed as desired to simulate a challenging case for the user. Additional details of inflatable bladder 28 and respiration and inspiration of lungs 26 is provided in FIG. 1C and FIG. 1D.

FIG. 1C, depicts an example of respiration of lungs 26. As described above, inflatable bladder 28 is housed within housing unit 24. Inflatable bladder 28 may be located within certain distance from lungs 26 such that when a threshold amount of air is pumped into inflatable bladder 28, inflatable bladder 28 inflates to a threshold inflation point and pushes up against lungs 26 in such a manner that a certain amount of pressure is applied on lungs 26. FIG. 1C depicts such an inflation of inflatable bladder 28. The amount of pressure applied on lungs 26 when inflatable bladder 28 reaches threshold inflation point is sufficient to cause the intrapulmonary pressure of lungs 26 to increase to a threshold intrapulmonary pressure. The threshold intrapulmonary pressure may be an amount of intrapulmonary pressure sufficient to cause lungs 26 to exhale the air within lungs 26. Air flow 32a indicates exhalation of air from lungs 26. The threshold amount of intrapulmonary pressure of lungs 26 may be an amount greater than atmospheric pressure. The threshold amount of air pumped into inflatable bladder 28 causes the intrapulmonary pressure of lungs 26 to be greater than atmospheric pressure. Thus, when the threshold amount of air is pumped into inflatable bladder 28, respiration occurs or lungs 26 deflate.

FIG. 1D, depicts an example of inspiration of lungs 26. As described above, when the threshold amount of air is pumped into inflatable bladder 28, respiration occurs. If the amount of air pumped into inflatable bladder 28 is less than the threshold amount of air, then the amount of pressure applied on lungs 26 is less and the intrapulmonary pressure of lungs 26 is less than the threshold amount of intrapulmonary pressure. If the intrapulmonary pressure of lungs 26 is less than the threshold amount of intrapulmonary pressure, and as long as the integrity of housing unit 24 remains intact, the intrapulmonary pressure of lungs 26 is less than the pressure external to the lungs and/or housing unit 24, and because air flows from an area of higher pressure to an area of lower pressure, air will flow into lungs 26, as depicted by air flow 32b. Alternatively, or in addition, lungs 26 may be filled with air via positive pressure ventilation, such as by using the air pump device connected to respiratory controller 21a.

Respiratory controller 21a may also be configured to receive an array of input values, including information regarding the location of the navigational tool within the lungs 26, the housing unit 24, or external to housing unit 24 in the case of a percutaneous or surgical procedure. Additionally, the respiratory controller 21a may be configured to increase or decrease the volume of air pumped into the inflatable bladder 28 based on the location of the navigational tool within or outside of the lungs 26 or the housing unit 24. Respiratory controller 21a may also be configured to increase or decrease the frequency at which the air pump device pumps air into the lungs 26 within the housing unit 24 based on the location of the navigational tool within or outside the lungs 26 or the housing unit 24. Such changes in volume and frequency of air pumped into inflatable bladder 28 may simulate various physiological responses and reflexes including coughing.

To simulate coughing, respiratory controller 21a may be configured to rapidly increase the amount of air pumped into the inflatable bladder 28 causing inflatable bladder 28 to expand rapidly. Rapid expansion of the inflatable bladder 28a acts on the volume within the housing unit 24 and the simulated lungs 26 to cause a rapid increase in the amount of pressure applied to lungs 26, which in turn causes the intrapulmonary pressure of lungs 26 to rapidly increase past the threshold amount of intrapulmonary pressure and causes the rapid compression of the air volume in both housing unit 24 and lungs 26. Since, only the simulated lungs 26 are operably connected to the atmosphere, the result is a compression of the lungs 26 and the forceful expiration of air from the lungs 26 much as experienced during a cough. Respiratory controller 21a may also be configured to simulate different intensities of coughing, ranging from violent coughing to mild coughing. Respiratory controller 21a may also be configured to simulate coughing randomly, or in response to a certain action taken by the clinician such as a tool being inserted into the lungs. Respiratory controller 21a may also be configured to simulate coughing based on the location of a navigational tool within the lungs housed in the housing unit 24.

Respiratory controller 21a may push or pump air into and suction air out of inflatable bladder 28 based on one or more input values received from one or more tools employed in the thoracic navigation system described herein. Respiratory controller 21a may also be configured to push or pump air into and suction air out of inflatable bladder 28a based on execution, by one or more processors of respiratory controller 21a, of on one or more sequence of instructions stored in one or more memory units of respiratory controller 21a. As will be appreciated, the one or more sequence of instructions may implement various algorithms that may be employed to achieve a variety of intensities and frequencies of coughs to simulate a patient in distress.

Fluid controller 22a may be configured to control administration of bodily fluids to the lungs 26. Fluid controller 22a may be connected to one or more fluid sources (not shown) and inject fluid, via tube 22b, into a certain location within the lungs housed in the housing unit 24. For the purpose of illustrating a clear example, only one fluid controller 22a is depicted in FIG. 1. However, multiple fluid controllers maybe added into the integrated training system described herein. Furthermore, each fluid controller may inject fluid at different locations within the lungs, based on the location within the lungs, into which the corresponding tube of the fluid controller is inserted. Tube 22b may be a thin tube comprised of medical grade materials, such as a catheter.

A fluid source may comprise of blood, mucus, or any other fluid that may be relevant for the particular procedure being simulated for a clinician. Additionally, fluid sources may comprise of substitutes for blood and mucus, a red color fluid and tapioca pudding, respectively. The amount of fluid injected into the lungs by fluid controller 22a may be based on several factors including, but not limited to, location of a navigational tool within the lungs, the procedure being performed, and various sequences of actions performed by the clinician, which may reflect various real-world situations such as airway hemorrhage, obscured vision, hypoxemia, etc.

In one example, the fluid controller 22a and its tube 22b may be connected to naturally occurring luminal networks such as the blood vessels of the lungs. In such an example large blood vessels may be identified and the entirety of the vascular network infused with fluid. As will be appreciated this may require pre-treatment of the lungs to seal certain blood vessels which may have been severed in the harvesting process. Additionally, post-treatment procedures requiring the clinician to perform the appropriate techniques to accommodate and treat whatever conditions and simulations are encountered, may also be required. A variety of vessel sealing tools including electrosurgical and ultrasonic vessel sealers may be employed for the purpose of returning the vasculature to patency to be useful as described herein. Alternatively, tube 22b may connect to a variety of locations within the lungs to inject mucus and other fluids to create a lifelike experience for the user. These may also be manually controlled such as with a syringe. In yet a further example fluid controller 22a may be connected to a pump (not shown) to simulate a heartbeat allowing for circulation of fluid through the vasculature. This has the added benefit of providing lifelike experiences when blood vessels within the lungs are severed during a procedure.

Figure 2:
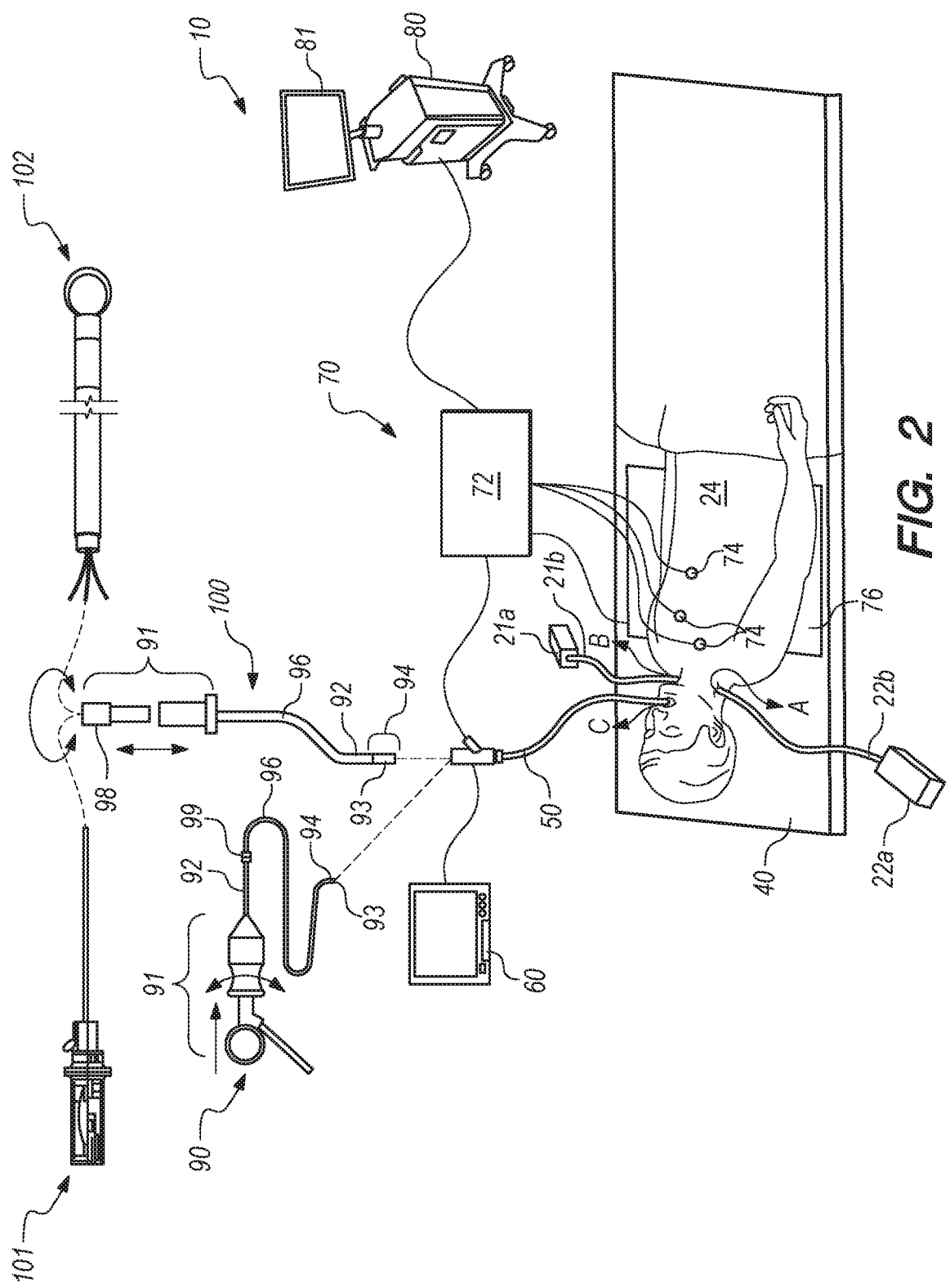
FIG. 2 illustrates an example arrangement an integrated training system provided in accordance with the present disclosure configured for navigating a tool within a set of lungs.

FIG. 2 depicts an exemplary arrangement of an integrated training system provided in accordance with the present disclosure. Housing unit 24 of FIG. 1A is depicted in a different form in FIG. 2. In FIG. 2 housing unit 24 is depicted as a human. In FIG. 2 housing unit 24 comprises at least 3 ports, A, B, C. Housing unit 24 is coupled with respiratory controller 21 *a* via tube 21 *b* at port B. Housing unit 24 is also coupled fluid controller 22 *a* via tube 22 *b* at port A and housing unit 24 is coupled with bronchoscope 50 at port C. Housing unit 24 of FIG. 2 may comprise a set of lungs 26, as described above. In some embodiments, housing unit 24 may also comprise a diaphragm simulator as described in FIG. C.

In FIG. 2, an electromagnetic navigation (EMN) system 10 is provided in accordance with the present disclosure. EMN system 10 may be employed in accordance with various example embodiments herein. An example of the EMN system is the ELECTROMAGNETIC NAVIGATION BRONCHOSCOPY® system currently sold by Medtronic, Inc. The specific number of components of the system 10 depicted in FIG. 2 and the arrangement and configuration thereof are provided for illustrative purposes only, and should be construed as limiting. EMN system 10 may be used to plan a pathway to target tissue, navigate a positioning assembly to the target tissue, navigate a biopsy tool to the target tissue to obtain a tissue sample from the target tissue and use the biopsy tool to digitally mark the location where the tissue sample was obtained, and place one or more echogenic markers at or around the target.

EMN system 10 includes an operating table 40 configured to support housing unit 24, a bronchoscope 50 configured for insertion through the mouth and/or nose of the housing unit 24 and into the airways of the lungs in the housing unit 24, monitoring equipment 60 coupled to bronchoscope 50 for displaying video images received from bronchoscope 50, a tracking system 70 including a tracking module 72, a plurality of reference sensors 74, an electromagnetic field generator 76, and a workstation 80 including software and/or hardware used to facilitate pathway planning, identification of target tissue, navigation to target tissue, and digitally marking the biopsy location.

Catheter guide assemblies may be used with EMN systems. FIG. 2 depicts two types of catheter guide assemblies 90, 100. Catheter guide assemblies 90, 100 are usable with the EMN system 10 and share a number of common components. Each of the catheter guide assemblies 90, 100 includes a handle 91, which is connected to an extended working channel (EWC) 96. The EWC 96 may be sized for placement into the working channel of a bronchoscope 50. In operation, a locatable guide (LG) 92, including an electromagnetic (EM) sensor 94, is inserted into the EWC 96 and locked into position such that the sensor 94 extends a desired distance beyond the distal tip of the EWC 96.

The location of the EM sensor 94, and thus the distal end of the EWC 96, within an electromagnetic field generated by the electromagnetic field generator 76 can be derived by the tracking module 72, and the workstation 80. Catheter guide assemblies 90, 100 have different operating mechanisms. In one embodiment, catheter guide assemblies 90, 100 contain a handle 91 that can be manipulated by rotation and compression to steer the distal tip 93 of the LG 92, extended working channel 96.

Catheter guide assembly 90 is currently marketed and sold by Covidien LP under the name SUPERDIMENSION® Procedure Kits. Catheter guide assembly 100 is currently sold by Covidien LP under the name EDGE™ Procedure Kits. Both kits include handle 91, EWC 96, and LG 92. For a more detailed description of catheter guide assemblies 90, 100, reference is made to commonly-owned U.S. Pat. No. 9,247,992, entitled "MICROWAVE ABLATION CATHETER AND METHOD OF UTILIZING THE SAME", filed on Mar. 15, 2013 by Ladtkow et al., the entire contents of which are hereby incorporated by reference.

Catheter guide assemblies 90, 100 including LG 92 and EWC 96 are configured for insertion through a working channel of bronchoscope 50 into the airways of the lungs within the housing unit 24 (although the catheter guide assemblies 90, 100 may alternatively be used without bronchoscope 50). The LG 92 and EWC 96 are selectively lockable relative to one another via a locking mechanism 99. A six degrees-of-freedom electromagnetic tracking system 70, e.g., similar to those disclosed in U.S. Pat. No. 6,188,355 and published PCT Application Nos. WO 00/10456 and WO 01/67035, the entire contents of each of which is incorporated herein by reference, or any other suitable positioning measuring system is utilized for performing navigation, although other configurations are also contemplated.

EM tracking system 70 may be configured for use with catheter guide assemblies 90, 100 to track the position of EM sensor 94 as it moves in conjunction with EWC 96 through the airways of the lungs housed in the housing unit 24, as detailed below. In an embodiment, EM tracking system 70 includes a tracking module 72, a plurality of reference sensors 74, and an EM field generator 76. As shown in FIG. 1, EM field generator 76 is positioned beneath the housing unit 24. EM field generator 76 and the plurality of reference sensors 74 are interconnected with tracking module 72, which derives the location of each reference sensor 74 in the six degrees of freedom. One or more of reference sensors 74 are attached to the chest of the housing unit 24. The six degrees of freedom coordinates of reference sensors 74 are sent as data to computing device 80, which includes application 81, where the data from sensors 74 are used to calculate a housing unit 24 coordinate frame of reference.

Computing device 80 includes software and/or hardware, such as an EMN application 81, used to facilitate the various phases of an EMN procedure, including generating the 3D model, identification of a target location, planning a pathway to the target location, registration of the 3D model with the actual airways of the lungs within the housing unit 24, and navigation to the target location. For example, during procedure planning, computing device 80 utilizes computed tomography (CT) scan, magnetic resonance imaging (MRI) scan, X-ray scan, cone beam computed tomography (CBCT) scan, and/or positron emission tomography (PET) scan image data for generating and viewing the 3D model of the airways of the lungs within the housing unit 24, enables the identification of a target location on the 3D model (automatically, semi-automatically or manually), and allows for the determination and selection of a pathway through the airways of the lungs within the housing unit 24 to the target location. While the CT scan image data may have gaps, omissions, and/or other imperfections included in the image data, the 3D model is a smooth representation of the airways of the lungs within the housing unit 24, with any such gaps, omissions, and/or imperfections in the CT scan image data filled in or corrected. The 3D model may be presented on a display monitor associated with computing device 80, or in any other suitable fashion. An example of the planning software described herein can be found in U.S. Patent Publication Nos. 2014/0281961, 2014/0270441, and 2014/0282216, filed by Baker et al. on Mar. 15, 2013, and entitled "PATHWAY PLANNING SYSTEM AND METHOD", the contents of all of which are incorporated herein by reference. Further examples of the planning software can be found in commonly assigned U.S. patent application Ser. No. 14/753, 288, entitled "SYSTEM AND METHOD FOR NAVIGATING WITHIN THE LUNG", filed on Jun. 29, 2015, by Brown et al., the contents of which are incorporated herein by reference.

Using computing device 80, various views of the 3D model may be presented and may be manipulated by a clinician to facilitate identification of a target location and selection of a suitable pathway through the airways of the lungs of housing unit 24 to access the target location. The 3D model may include, among other things, a model airway tree corresponding to the actual airways of the lungs within housing unit 24, and showing the various passages, branches, and bifurcations of the actual airway tree of the lungs housed within housing unit 24. Additionally, the 3D model may include lesions, markers, blood vessels and vascular structures, lymphatic vessels and structures, organs, other physiological structures, and/or a 3D rendering of the pleura. Some or all of the aforementioned elements may be selectively displayed, such that the clinician may choose which elements should be displayed during when viewing the 3D model. For example, EMN application 81 may be configured in various states to display the 3D model in a variety of view modes. For each view of the 3D model, the angle from which the 3D model is displayed may correspond to a view point. The view point may be fixed at a predefined location and/or orientation, or may be adjusted by the clinician operating computing device 80 or by a proctor or instructor overseeing the training of the clinician.

Following pathway planning, a procedure may be undertaken in which EM sensor 94, in conjunction with tracking system 70, enables tracking of EM sensor 94 (and thus the distal end of EWC 96 or tool 102) as EM sensor 94 is advanced through the airways of the lungs in the housing unit 24 following the pathway planned during the pathway planning phase. As an initial step of the procedure, the 3D model is registered with the actual airways of the lungs within the housing unit 24. One potential method of registration involves navigating a locatable guide into each lobe of the lungs within the housing unit 24 to at least the second bifurcation of the airways of that lobe. The position of the locatable guide is tracked during this registration phase, and the 3D model is iteratively updated based on the tracked position of the locatable guide within the actual airways of the lungs within the housing unit 24. This registration process is described in commonly-owned U.S. Patent Application Publication No. 2011/0085720, entitled "AUTOMATIC REGISTRATION TECHNIQUE," filed on May 14, 2010, by Barak et al., and U.S. patent application Ser. No. 14/790,581 entitled "REAL-TIME AUTOMATIC REGISTRATION FEEDBACK", filed on Jul. 2, 2015, by Brown et al., the contents of each of which are incorporated herein by reference. While the registration process focuses on aligning the actual airways of the lungs within the housing unit 24 with the airways of the 3D model, registration also ensures that the position of vascular structures and the pleura are accurately determined, in order to provide accurate analysis and analytics of threat to the vascular structures of the lungs from the actions of the clinician.

Figure 3A:
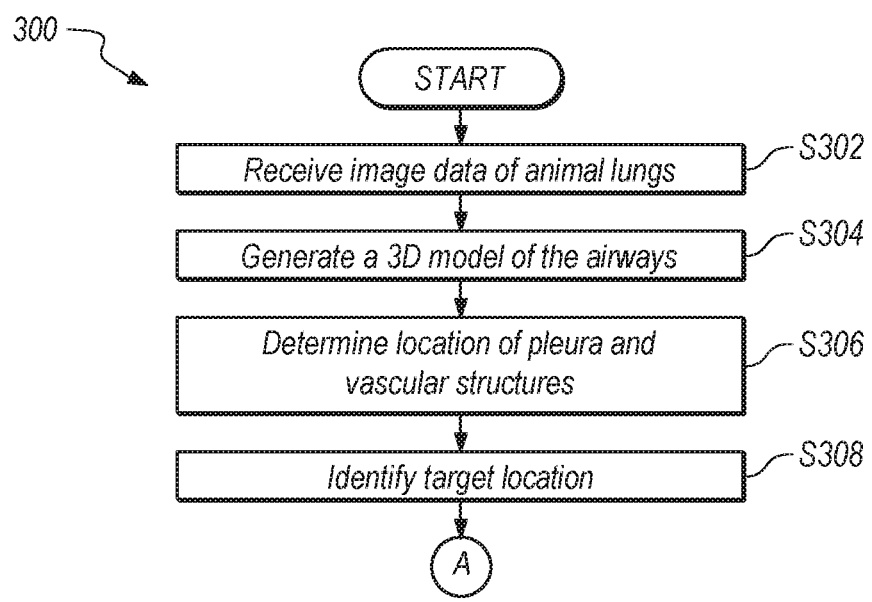
FIG. 3A-3C illustrates a method of analyzing threat to structures within a set of lungs during a bronchoscopy.
Figure 3B:
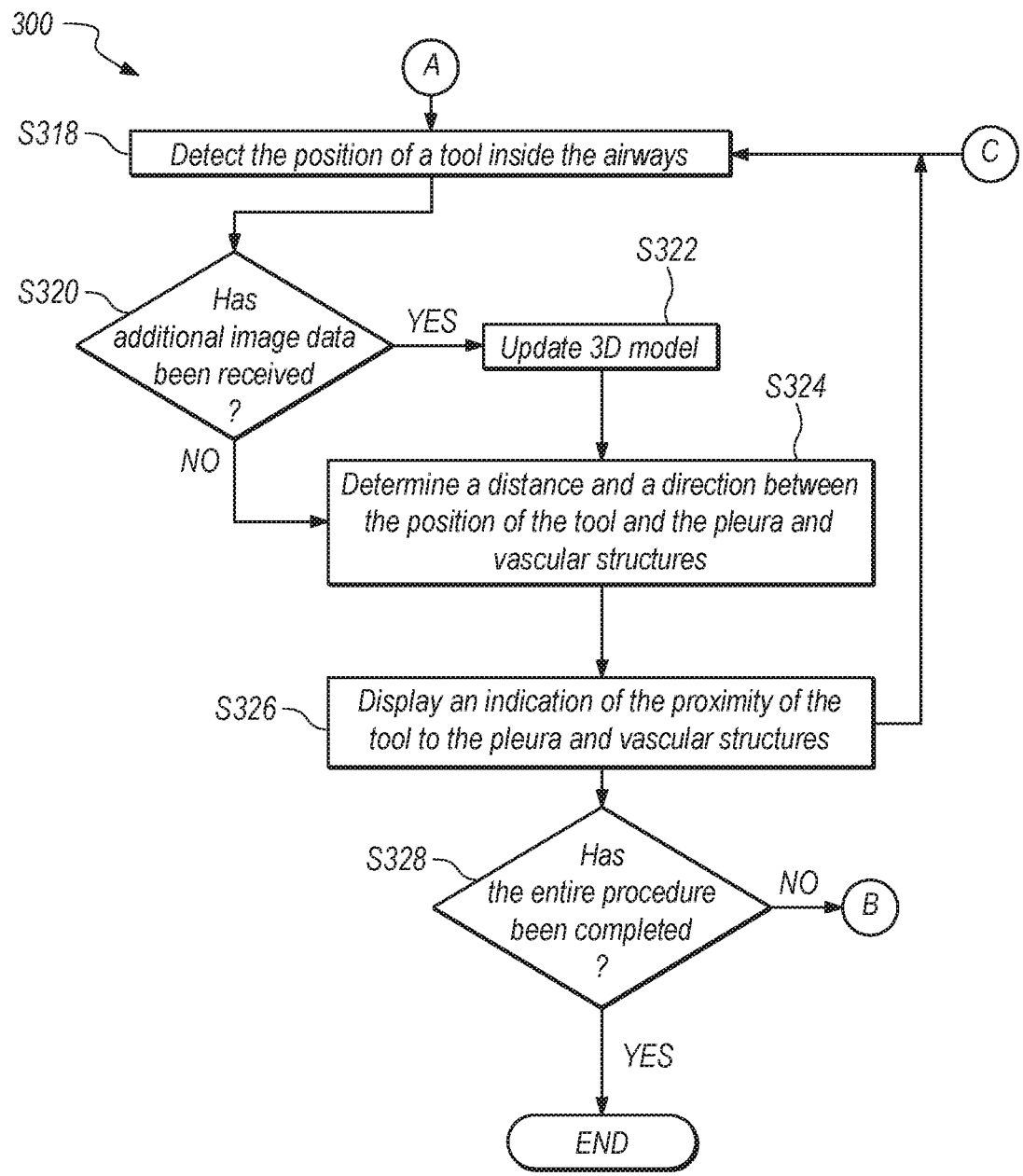
Figure 3C:
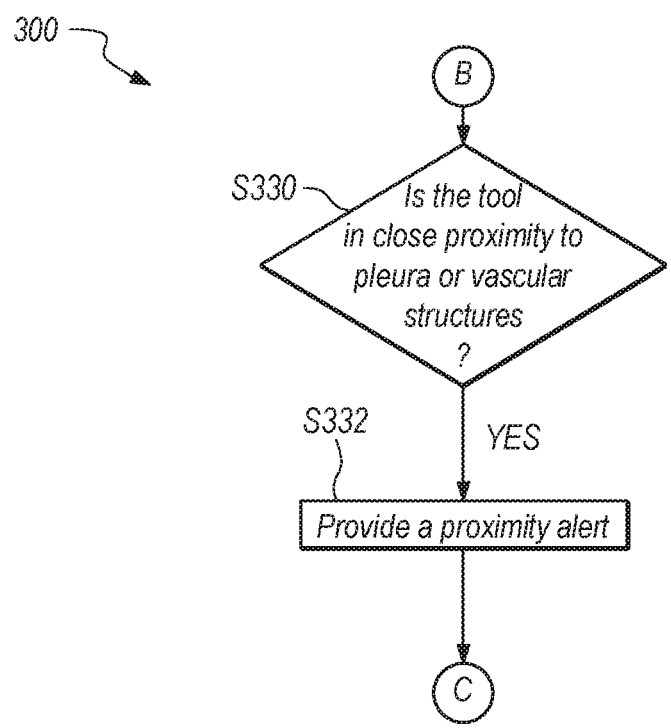

FIG. 3A-3C depict exemplary computer-implemented methods for providing threat analysis and analytics from the actions of the clinician to the clinician. Methods and/or techniques described in FIG. 3A-3C provide threat analysis and analytics to a clinician by providing proximity awareness to pleural boundaries and vascular structures. Methods and/or techniques described in FIG. 3A-3C may be performed by one or more processors of application 81, wherein the instructions for the methods and/or techniques may be stored in one or more memory units coupled with the processors. Additionally, the particular sequence of steps shown in the method 300 of FIGS. 3A-3C is provided by way of example and not limitation. Thus, the steps of the method 300 may be executed in sequences other than the sequence shown in FIGS. 3A-3C without departing from the scope of the present disclosure. Further, some steps shown in the method 300 of FIGS. 3A-3C may be concurrently executed with respect to one another instead of sequentially executed with respect to one another.

Method 300 generally includes a planning phase, shown in FIG. 3A, followed by a navigation phase, shown in FIGS. 3B and 3C. The planning phase of method 300 may begin at step S302, where computing device 80 receives image data of the chest of housing unit 24, including the lungs housed within housing unit 24. As noted above, the images may be received from various imaging devices using various imaging modalities, including a CT scan, MRI scan, PET scan, X-ray scan, CBCT scan, and/or any other applicable imaging modality known to those skilled in the art. For illustrative purposes, this description will use CT scan data as the image data.

At step S304, a 3D model of the lungs within the housing unit 24 is generated. In some embodiments, the 3D model may be based on the image data received during step S302, image data previously stored on computing device 80, and/or previously generated 3D models of the lungs. The 3D model may show, among other things, the parenchyma of lungs, such as the airways, as well as other structures such as blood vessels and lymphatic structures, among others.

Thereafter, at step S306, a location of the pleura of the lungs within the housing unit 24 as well as vascular structures and/or other physiological elements is determined, as described above. A determination of the location of the pleura and vascular structures may be based on the image data received during step S302, and/or the 3D model generated during step S304. For example, one or more image processing algorithms may be employed to detect anatomical features, such as the pleura, the esophagus, the diaphragm, the heart, and/or vascular structures. In an embodiment, a region growing algorithm similar to that used during generation of the 3D model may additionally or alternatively be used. In addition, data regarding the movement of the airways of the lungs within the housing unit 24 during the respiratory cycle may be used to compensate for differences in the detected locations of the pleural surfaces and vascular structures. Systems, devices, and methods for detecting movement of the airways during the respiratory cycle is further described in co-pending application Ser. No. 15/254,141, entitled "RESPIRATION MOTION STABILIZATION FOR LUNG MAGNETIC NAVIGATION SYSTEM", filed on Sep. 1, 2016, by Lev A. Koyrakh et al., the contents of which is incorporated herein by reference.

At step S308, a target location is identified in the 3D model of the airways of the lungs within housing unit 24. The target location may be the site where primary treatment will be performed. For example, the target location may be the site where a tumor or lesion is located. Alternatively, the target location may be a previous treatment site that requires additional treatment. The target location may be manually selected by a clinician, and/or may be automatically determined by computing device 80 and/or application 81 and reviewed by the clinician.

As indicated in FIG. 3A, the planning phase of the EMN procedure (e.g., steps S302-S316) are executed at least once prior to the start of the navigation phase, in an embodiment. In another embodiment, the steps S302-S316 may be repeated during the navigation phase of the EMN procedure. Numerous other steps may performed during the planning phase, omitted here for purposes of brevity, but described in U.S. Patent Publication Nos. 2014/0281961, 2014/0270441, and 2014/0282216, filed by Baker et al. on Mar. 15, 2013, and entitled "PATHWAY PLANNING SYSTEM AND METHOD", the contents of all of which are incorporated herein by reference.

After completion of the planning phase of the EMN procedure, the clinician may initiate the navigation phase. The navigation phase generally begins with the insertion of bronchoscope 50, EWC 96, and EM sensor 94 into the airways of the lungs within the housing unit 24. As noted above, EM sensor 94 may be included in LG 92, biopsy tool 102, and/or microwave ablation tool 104. EM sensor 94 may also be included in a surgical needle or other thoracoscopic instrument or tool. In some embodiments, EM sensor 94 may be included in a surgical tool or implement that is inserted into the airways without the use of bronchoscope 50 and/or EWC 96.

With reference to FIG. 3B, thereafter, at step S318 of FIG. 3B, a position of EM sensor 94 inside the airways of the lungs in the housing unit 24 is detected, by using, for example, EM tracking system 70. Step S318 may be iteratively repeated while EM sensor 94 is navigated about the airways. In some embodiments, EM sensor 94 may not be located inside an airway but rather at some other position inside the lungs, such as other lung tissue, or a tumor.

At step S320, a determination is made whether additional image data has been received. For example, during the navigation phase, computing device 80 may receive additional image data of the lungs in the housing unit 24, for example, from a CBCT scan and/or ultrasound scan performed concurrently with, or at intervals during the navigation phase of the EMN procedure. Additionally or alternatively, data may be collected during the navigation phase, such as data relating to the position of EM sensor 94. If additional image data has been received, processing proceeds to step S322 where the 3D model is updated according to the additional data and then to step S324. If not, processing proceeds to step S324.

At step S324, a distance between the position of EM sensor 94 (detected at step S318) and the location of the pleura and vascular structures (determined at step S306) is determined. Likewise, a direction between the position of EM sensor 94 and the location of the pleura and vascular structures is determined. Thereafter, at step S326, an indication of the proximity of EM sensor 94 to the location of the pleura and vascular structures is displayed. The indication may be provided as the distance from the closest pleural surface or vascular structure, and/or may include a direction indicator to the closest pleural surface or vascular structure, based on the determination at step S324. For example, the display may include an arrow pointing in the direction of the closest pleural surface or vascular structure, and have a distance metric, such as the distance in millimeters, to the closest pleural surface or vascular structure. The indication of the proximity of EM sensor 94 to the location of the pleura or vascular structure, including the distance and direction to the closest pleural surface and/or vascular structure may be iteratively updated as EM sensor 94 is moved and new distances and directions are determined. Similarly, a count-down indicator may be displayed, representing the distance between EM sensor 94 and the closest pleural surface and/or vascular structure. Additionally, the indication may be in the form of an audible or sensory indicator. Further, events such as bleeding or the occurrence of a pneumothorax can also be programmed into the simulation to occur during the procedure to assess the ability of the clinician and the team to accommodate and adapt to such events.

Next, at step S328, it is determined whether the entire procedure has been completed. For example, application 81 may determine, based on user input and/or based on automatic processing such as by analyzing the planned procedure settings and the position of the tool, whether the entire procedure has been completed. If it is determined that the entire procedure is complete, the method ends. However, if it is determined that the entire procedure has not been completed, the method proceeds to step S330.

Turning now to FIG. 3C, at step S330, a determination is made as to whether EM sensor 94 is in close proximity, such as, within a predetermined distance, to a pleural surface and/or vascular structure. If it is determined that EM sensor 94 is in close proximity to a pleural surface and/or vascular structure, a proximity alert is provided at step S332, whereafter processing returns to step S318. The proximity alert may be a visual alert displayed by application 81 and/or an audible or sensory alert provided by application 81.

Similar to the above description of the planning phase, numerous steps of the navigation phase are omitted here for purposes of brevity, but are described in U.S. patent application Ser. No. 14/753,288, entitled "SYSTEM AND METHOD FOR NAVIGATING WITHIN THE LUNG", filed on Jun. 29, 2015, by Brown et al., the contents of which are incorporated herein by reference.

While the above-provided embodiments are directed to providing proximity awareness to pleural surfaces and/or vascular structures, it is envisioned that the above-described system may be used to provide guidance while navigating to a pleural surface or vascular structure, for example, to inject a dye or place a marker subpleurally or proximate the pleural surface or vascular structure. Additionally, once such dyes or markers are placed, the system may be updated to provide proximity awareness to such dyes or markers similar to the above-described methods of providing proximity awareness to critical structures.

While the above-described systems, devices, and methods are directed to performing an EMN procedure, it will be appreciated by those skilled in the art that the same or similar devices, systems, and methods may be used to perform a percutaneous surgical procedure. For example, in planning a percutaneous surgical procedure, the clinician may take into account the locations of the pleura and vascular structures when deciding on which access route to use to a particular treatment location.

Detailed embodiments of devices, systems incorporating such devices, and methods using the same as described herein. However, these detailed embodiments are merely examples of the disclosure, which may be embodied in various forms. Therefore, specific structural and functional details disclosed herein are not to be interpreted as limiting, but merely as a basis for the claims and as a representative basis for allowing one skilled in the art to variously employ the present disclosure in appropriately detailed structure. While the preceding embodiments are described in terms of bronchoscopy of airways of animal lungs, those skilled in the art will realize that the same or similar devices, systems, and methods may be used in other lumen networks, such as, for example, the vascular, lymphatic, and/or gastrointestinal networks as well. Additionally, the same or similar methods as those described herein may be applied to navigating in other parts of the body, such as the chest areas outside of the lungs, the abdomen, pelvis, joint space, brain, spine, etc.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure Like reference numerals may refer to similar or identical elements throughout the description of the figures. Further, as used herein and as will be understood by those skilled in the art, the term "fluid" may refer to liquid and/or gaseous substances.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)." The term "clinician" may refer to a clinician or any medical professional, such as a doctor, nurse, technician, medical assistant, or the like, performing a medical procedure.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more machine-readable media or memory. The term "memory" may include a mechanism that provides (e.g., stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals. It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system comprising:
    a housing unit configured to simulate the chest cavity of a patient;
    at least one simulated lung located within the housing unit, the at least one simulated lung including a plurality of airways, and an exterior of the at least one simulated lung being sealed from the atmosphere by the housing unit;
    a locatable catheter configured to be navigated within the plurality of airways of the at least one simulated lung to target tissue within the at least one simulated lung;
    a respiratory controller configured to control inspiration and expiration of air into and out of the plurality of airways of the at least one simulated lung;
    a fluid controller configured to control administration of a fluid to the at least one simulated lung;
    a display device;
    a computing device in communication with the display device and including a processor and a memory; and
    an application, stored in the memory and executed by the processor, which when executed, causes the computing device to:
        generate a three-dimensional (3D) model of the at least one simulated lung based on imaging of the at least one simulated lung;
        register the 3D model with the plurality of airways of the at least one simulated lung based on navigation of the locatable catheter within the plurality of airways of the at least one simulated lung;
        identify a location of the pleura of the at least one simulated lung in the 3D model;
        determine a distance between a location of a distal end portion of the locatable catheter and the identified location of the pleura;
        determine a direction between the location of the distal end portion of the locatable catheter and the identified location of the pleura;
        display, on the display device, the determined distance as a numerical value;
        display, on the display device, the determined direction as a directional symbol pointing from the distal end portion of the locatable catheter in the direction of the identified location of the pleura; and
        update, in real time, the displayed numerical value and the displayed directional symbol as the locatable catheter is navigated within the plurality of airways.

2. The system of claim 1, further comprising a thoracic navigation system including a catheter guide assembly.

3. The system of claim 2, wherein the thoracic navigation system includes an electromagnetic navigation system.

4. The system of claim 2, further comprising at least one tool insertable into the at least one simulated lung, the tool including a sensor detectable by the thoracic navigation system.

5. The system of claim 2,
wherein the application, when executed by the processor, causes the computing device to display, on the display device, one or more user interface images representing the location of a tool within the at least one simulated lung in relation to one or more pre-procedure images.

6. The system of claim 2,
wherein the application, when executed by the processor, causes the computing device to display, on the display device, one or more user interface images representing the location of a tool within the at least one simulated lung in relation to a 3D model of the at least one simulated lung.

7. The system of claim 2, further comprising an intra-procedure imaging modality.

8. The system of claim 7, further comprising:
wherein the application, when executed by the processor, causes the computing device to display, on the display device, one or more user interface images representing the location of a tool within the at least one simulated lung in relation to one or more intra-procedure images.

9. The system of claim 8, wherein the intra-procedure images are presented in combination with the pre-procedure images.

10. The system of claim 1, wherein the fluid controller is in fluid communication with a vascular network of the at least one simulated lung, and the fluid simulates blood.

11. The system of claim 1, wherein the fluid controller is in fluid communication with one or more locations within the plurality of airways, and the fluid simulates mucus.

12. The system of claim 1, wherein the fluid controller is configured to inject the fluid into the airways of the at least one simulated lung based on the location of a tool within the at least one simulated lung to simulate an airway hemorrhage or pneumothorax.

13. The system of claim 12, wherein the location of the tool is determined by a thoracic navigation system.

14. The system of claim 1, wherein the respiratory controller is configured to control the inspiration and expiration of air into the at least one simulated lung to simulate coughing.

15. The system of claim 1, further comprising a vacuum source which is controlled by the respiratory controller and in fluid communication with the plurality of airways to simulate coughing by suctioning air out of the at least one simulated lung.

16. The system of claim 1, further comprising an inflatable bladder within the housing unit, wherein rapid inflation of the bladder forces deflation of the at least one simulated lung to simulate coughing or a pneumothorax.

17. The system of claim 1, further comprising a tool insertable from an exterior of the housing unit through a membrane in an interior of the housing unit and into the at least one simulated lung while maintaining appropriate partitions and pressure differentials within the housing unit.

18. The system of claim 1, wherein the at least one simulated lung is an animal lung configured to simulate the lung of a human.

19. A training system for lung procedures, comprising:
a housing unit configured to simulate the chest cavity of a patient;
a simulated lung disposed within the housing unit;
a catheter configured to be navigated within a plurality of airways of the simulated lung to target tissue within the simulated lung;
a respiratory controller configured to control inspiration and expiration of air into and out of the plurality of airways of the simulated lung;
a fluid controller configured to control administration of fluids to the simulated lung;
a display device;
a computing device in communication with the display device and including a processor and a memory; and
an application, stored in the memory and executed by the processor, which when executed, causes the computing device to:
generate a three-dimensional (3D) model of the simulated lung based on imaging of the simulated lung;
register the 3D model with the plurality of airways of the simulated lung based on navigation of the catheter within the plurality of airways of the simulated lung;
identify a location of the pleura of the simulated lung in the 3D model;
determine a distance between a location of a distal end portion of the catheter and the identified location of the pleura;
determine a direction between the location of the distal end portion of the catheter and the identified location of the pleura;
display, on the display device, the determined distance as a numerical value;
display, on the display device, the determined direction as a directional symbol pointing from the distal end portion of the locatable catheter in the direction of the identified location of the pleura; and
update, in real time, the displayed numerical value and the displayed directional symbol as the locatable catheter is navigated within the plurality of airways.

20. The training system of claim 19, wherein the simulated lung is an animal lung configured to simulate the lung of a human.

* * * * *